(12) United States Patent
Stamps et al.

(10) Patent No.: US 8,287,237 B2
(45) Date of Patent: Oct. 16, 2012

(54) STEP-OVER BLADE-PITCH CONTROL SYSTEM

(75) Inventors: Frank B. Stamps, Colleyville, TX (US); Richard E. Rauber, Euless, TX (US); David A. Popelka, Colleyville, TX (US); Patrick R. Tisdale, Roanoke, TX (US); Thomas C. Campbell, Keller, TX (US); Keith Stanney, Dallas, TX (US); James L. Braswell, Jr., Colleyville, TX (US); Mark Wasikowski, Keller, TX (US); Tom Donovan, Fort Worth, TX (US); Bryan Baskin, Arlington, TX (US); John J. Corrigan, III, Coppell, TX (US); Ryan Smith, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 734 days.

(21) Appl. No.: 12/446,597

(22) PCT Filed: Dec. 8, 2006

(86) PCT No.: PCT/US2006/046099
§ 371 (c)(1),
(2), (4) Date: Apr. 22, 2009

(87) PCT Pub. No.: WO2008/073073
PCT Pub. Date: Jun. 19, 2008

(65) Prior Publication Data
US 2010/0021301 A1    Jan. 28, 2010

(51) Int. Cl.
*B64C 11/06* (2006.01)
(52) U.S. Cl. ........................ 416/102; 416/130
(58) Field of Classification Search ............ 416/98, 416/102, 103, 104, 121, 130
See application file for complete search history.

(56) References Cited

U.S. PATENT DOCUMENTS

| 5,511,947 | A | 4/1996 | Schmuck |
| 6,616,095 | B2 | 9/2003 | Stamps et al. |
| 7,037,072 | B2 | 5/2006 | Carson |
| 2003/0183722 | A1 | 10/2003 | Zoppitelli et al. |

OTHER PUBLICATIONS

A First Office Action in related Chinese Application No. 200680056178.1 from the State Intellectual Property Office of the People's Republic of China, dated Apr. 15, 2011, 4 pages.
International Search Report and Written Opinion in Parent Application PCT/US06/46099, dated Jun. 18, 2008, 7 pages.
International Preliminary Report on Patentability in Parent Application PCT/US06/46099, dated Jun. 10, 2009, 5 pages. Canadian Search Report in related Canadian Patent Application 2,665,676 by the Canadian Intellectual Property Office, dated Feb. 25, 2011, 2 pages.
Canadian Notice of Allowance in related Canadian Patent Application 2,665,676 by the Canadian Intellectual Property Office, dated Oct. 17, 2011, 1 page.
Second Office Action in corresponding Chinese Patent Application 200680056178.1 from the State Intellectual Property Office of the People's Republic of China, dated Dec. 7, 2011, received by Applicant on Dec. 16, 2011.

*Primary Examiner* — Dwayne J White
(74) *Attorney, Agent, or Firm* — James E. Walton; Noah A. Tevis

(57) ABSTRACT

A pitch control system for blades on a rotor of an aircraft has a gimballing rotor hub (31) and a plurality of step-over arms (61) connected to the hub and capable of pivoting relative to the hub about a pivot axis. Each of a plurality of pitch links (55) connects one of the step-over arms (61) to a flight control system for pivoting the connected step-over arm (61) about the pivot axis and relative to the hub in response to inputs from the control system. Each of a plurality of step-over links (69) connects one of the step-over arms (61) to one of the blades for rotating the associated blade about the pitch axis in response to pivoting of the associated step-over arm.

9 Claims, 8 Drawing Sheets

STEP-OVER BLADE-PITCH CONTROL SYSTEM

TECHNICAL FIELD

The present application is related to blade-pitch control systems.

DESCRIPTION OF THE PRIOR ART

Tiltrotor aircraft have rotors that are moveable between a generally vertical orientation for rotor-borne flight (helicopter mode) and a generally horizontal orientation for wing-borne flight (airplane mode). One example of a tiltrotor aircraft is the Bell/Boeing V-22, which has a pair of three-bladed rotors. To allow for use of a larger fuselage, more thrust, and/or higher speed, tiltrotors having four-bladed rotors have been proposed. However, four-bladed versions using prior-art types of gimbaled rotor hubs can be unstable in airplane mode due to inadequate damping of whirling.

Rotor-blade control systems for helicopters and tiltrotor aircraft are complex electrical and/or mechanical systems. The control systems respond to the pilot's input, but also must accommodate forces that act upon rotor assemblies and are generally outside the control of the pilot. Mechanical control systems typically include a swashplate, which consists of a stationary portion and a rotating portion. Typically, the lower, stationary portion is fixed in position and will not rotate, but has the ability to move up and down and/or tilt in any given direction. This is commonly referred to as the "stationary" or "non-rotating" plate. Pilot inputs alter the vertical position of the stationary plate through the collective control and the tilt of the stationary plate through the cyclic control. The rotating portion of the swashplate arrangement is free to rotate. Pilot inputs to the non-rotating portion are passed through to the rotating portion of the control systems.

In the prior art, the rotating portion is typically connected mechanically to each individual rotor blade. For example, in one type of control system, pitch links directly connect pitch horns on the rotor blades to the rotating plate of the swashplate, allowing the swashplate to alter the blade angle of each rotor blade.

However, it is necessary to include in control systems a subsystem which reduces the degree of flapping as much as possible. In tiltrotor aircraft, it is especially important to counteract the detrimental effects of flapping, especially because the aircraft is capable of very high speed travel, particularly in the airplane mode of flight. In the prior art, there are two basic approaches: one is to utilize an angled flap hinge; the other is to utilize offset pitch horns. Both of these approaches have the effect of introducing a kinematic pitch-flap coupling, or delta-3, parameter in the system, and the delta-3 parameter relates the amount of blade pitch change occurring for a given amount of blade flapping motion. Designers seek to optimize delta-3 for countering the flapping encountered in flight.

Another kinematic coupling parameter which affects aeroelastic stability and rotor response of tiltrotors is the pitch-cone coupling, or delta-0, parameter. Like pitch-flap coupling, the pitch-cone coupling parameter relates the amount of blade pitch change occurring for a given amount of blade coning motion, which involves vertical motions of pairs of blades. The pitch-cone coupling caused by delta-0 alters the aerodynamic coning forces acting on the rotor which modifies the rotor response, rotor frequency, and rotor hub forces. The pitch-cone coupling also changes the sensitivity of the rotor system to gust disturbances and, in a tiltrotor with four or more blades, can affect the flap-lag stability of the rotor system. This is because a tiltrotor with four or more blades has a reactionless coning mode, in which pairs of blades cone in different amounts and/or direction, that is not present on a three-bladed tiltrotor. The pitch-cone coupling alters the frequency of the out-of-plane reactionless coning mode frequency and can cause this mode to move closer to a reactionless in-plane mode. If the reactionless coning mode frequency is too close to the reactionless in-plane mode frequency, then potential flap-lag instability may occur.

An optimized rotor hub design must provide the proper pitch-flap coupling for controlling flapping and provide the proper pitch-cone coupling to ensure that flap-lag stability is maintained. Unfortunately, prior-art rotor hub configurations do not simultaneously provide desired pitch-flap coupling and pitch-cone coupling and are compromise configurations that optimize only one of the couplings.

DETAILED DESCRIPTION

A gimbaled rotor hub configuration is provided for use on an aircraft, the rotor hub configuration being particularly useful on tiltrotor aircraft. The rotor hub has a gimbaled yoke, which allows for flapping motions, and the blades of the rotor are adjustable for pitch angle. A step-over linkage between the swashplate and the pitch horn provides for control of the blade pitch, and this step-over linkage is able to simultaneously provide a desired value of pitch-flap coupling (delta-3) for whirl flutter stability and a desired value of pitch-cone coupling (delta-0) for reaction-less flap-lag stability. The step-over linkage allows a rotor having four or more blades to have the same delta-3 value as a three-blade rotor, can provide for delta-3 that varies with collective input to increase stability, and allows for the selection of desired delta-0 values. Without the step-over mechanism, one of these coupling parameters will not be at an optimum setting and will result in reduced aeroelastic stability.

Figure 1:
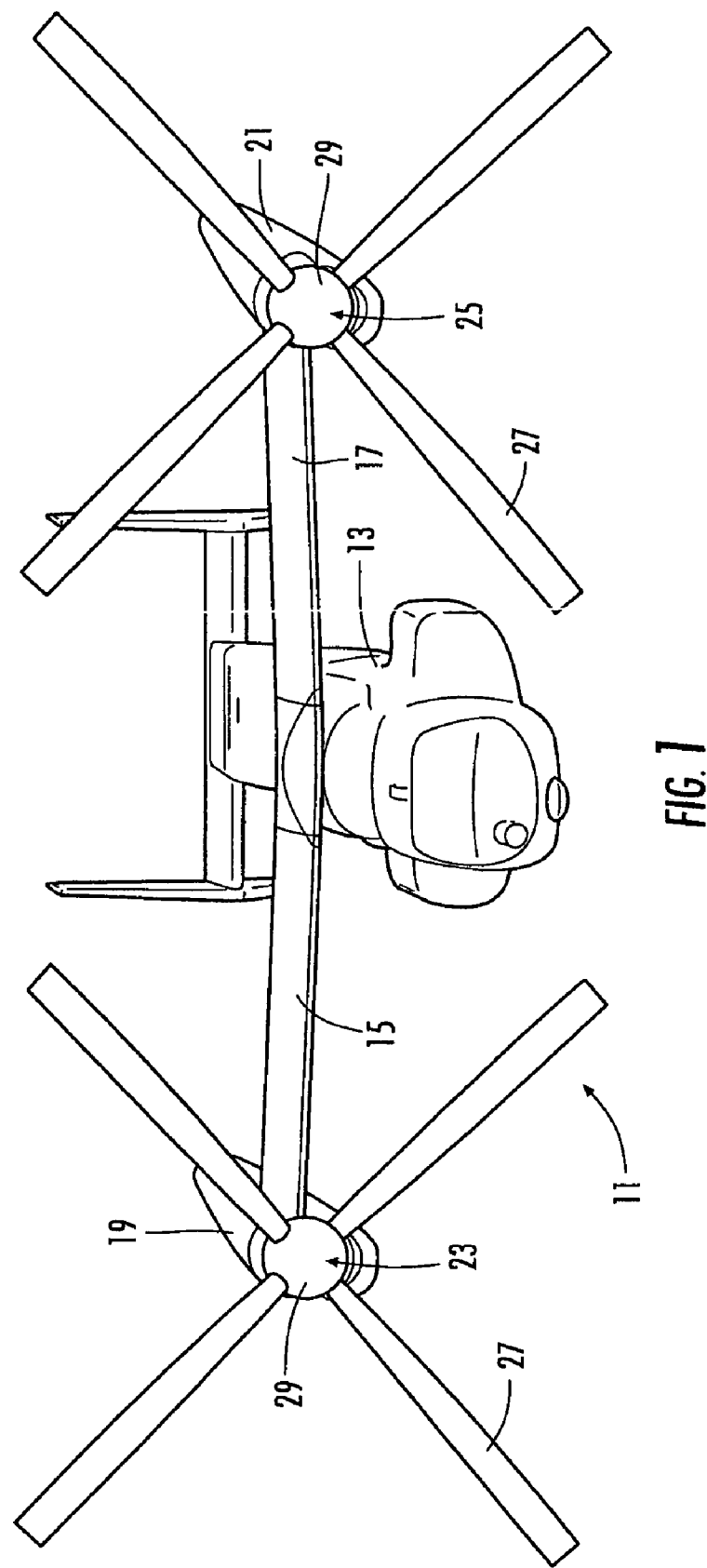
FIG. 1 is an oblique view of a tiltrotor aircraft having four-blade rotors.
Figure 2:
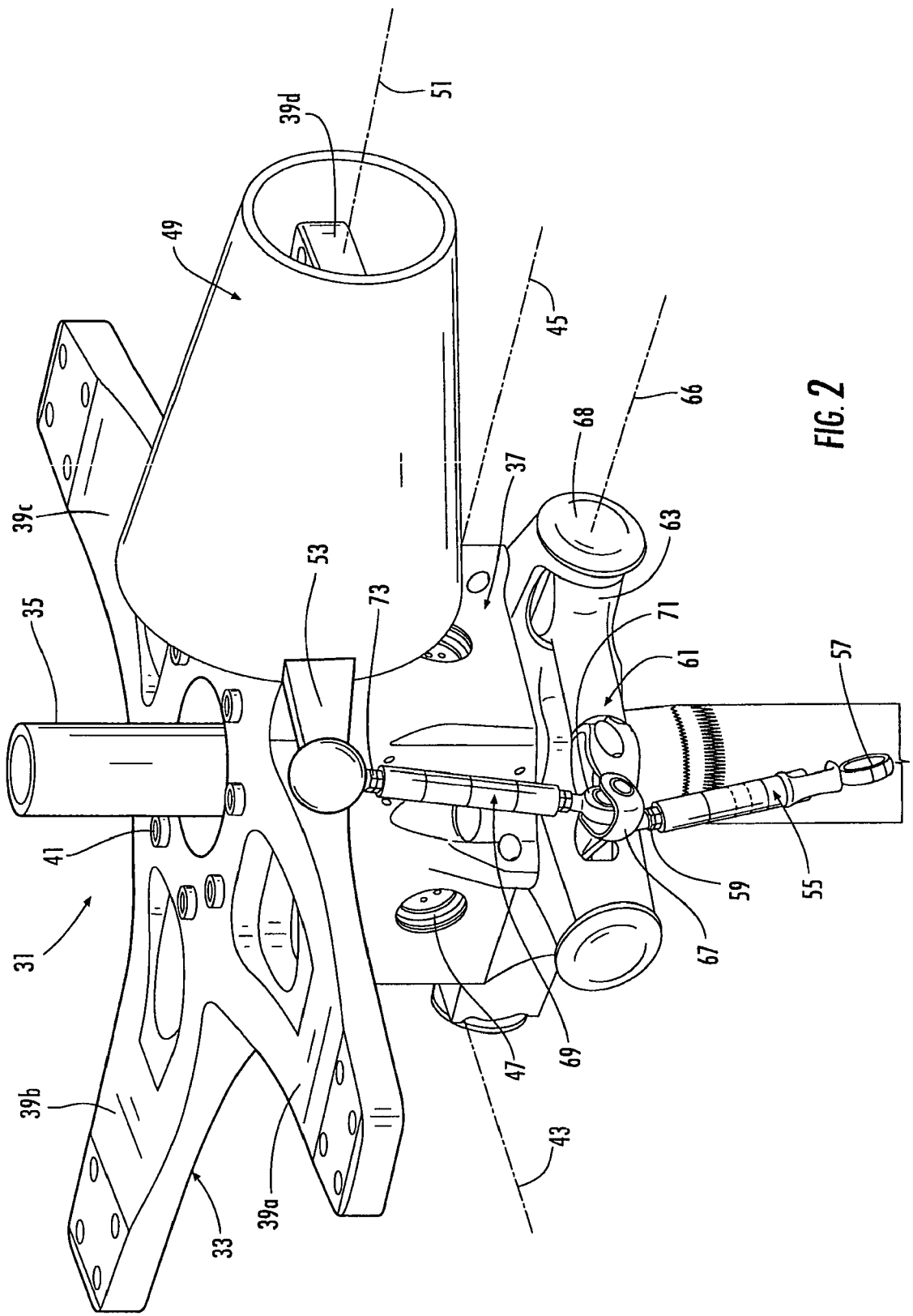
FIG. 2 is an oblique view of a rotor hub assembly according to a preferred embodiment and used on the aircraft of FIG. 1.

Referring to FIG. 1, aircraft 11 is a tiltrotor aircraft having a fuselage 13 and wings 15, 17 extending from fuselage 13. A nacelle 19, 21 is rotatably mounted to the outer end of each wing 15, 17, and each nacelle 19, 21 houses an engine (not shown) for rotating an attached prop-rotor 23, 25. Each prop-rotor, or rotor, has a plurality of rotor blades 27, and the embodiment shown has four blades 27 per rotor 23, 25. Each rotor 23, 25 also has a central rotor hub, which retains blades 27 and is located under a spinning cover 29. The rotor hubs are gimbaled hubs and have a step-over linkage, which is described below.

FIGS. 2 through 7 show a preferred embodiment of a rotor hub used on the aircraft of FIG. 1. Rotor hub assembly 31 comprises a yoke 33, which is connected to a mast 35 by a constant-velocity torque coupling 37 for rotation with the mast. In the embodiment shown yoke comprises four blade attachment arms 39a, 39b, 39c, 39d, and yoke is rigidly connected to torque coupling 37 with fasteners. Torque coupling 37 has a portion that is pivotable relative to mast 35 through rotation about perpendicular axes 43, 45 on bearings 47, and this configuration allows for yoke and blades (not shown) attached to arms 39a, 39b, 39c, 39d to gimbal relative to mast 35. As an illustrative example, a blade grip 49 is shown attached to arm 39d, blade grip 49 being pivotable on arm 39d about pitch axis for adjustability of the pitch angle of an attached blade. Blade grip 49 has a pitch horn 53 located on an inboard end of grip 49 and extending radially from grip 49. Movement of pitch horn 53 about axis 51 causes a corresponding change in blade pitch angle. Hub assembly 31 is shown with only one blade grip 49 on yoke 33, though a blade grip 49 and blade would be attached to each of arms 39a, 39b, 39c, 39d in the complete assembly.

Step-over linkages (only one shown) are provided for connecting each pitch horn 53 to a flight control system (not shown), such as, for example, a swashplate, for controlling the pitch angle of blades in response to input from the flight control system. The flight control system may be in a fixed position relative to mast 35 or may move relative to mast during operation, but the flight control system does not gimbal with yoke 33 and the attached blades relative to mast. A rigid pitch link 55 has spherical bearing rod ends 57, 59 on opposite ends of link 55, with a lower rod end 57 being connected to the flight control system, and an upper rod end 59 being connected to a step-over arm 61. Step-over arm 61 is a rigid member and is pivotally connected at a root end 63 to a step-over mount 65, which is rigidly connected to torque coupling 37. Each step-over arm pivots about a step-over axis 66. A link end 67, which is opposite root end 63, is configured for receiving rod end 59 of pitch link 55. A rigid step-over link 69 connects link end 67 of step-over arm 61 with pitch horn 53 of blade grip 49, step-over link 69 having lower rod end 71 and upper rod end 73 on opposite ends of link 69, each rod end 71, 73 being a spherical rod end. Use of spherical-bearing rod ends 57, 59, 71, 73 allows links 55, 69 to pivot relative to the component connected at each end of links 55, 69 at varying angles without interference.

The step-over linkage provides a significant advantage due to the decoupling of pitch-flap (delta-3) and pitch-cone (delta-0) kinematic parameters. This is due to the fact that the delta-0 term derives from the angle formed between a pitch horn of each blade, such as pitch horn 53, and the coning axis of the blades, whereas the delta-3 term derives from the angle formed between pitch link 55 and flapping axes 43, 45. A four-bar linkage is formed from pitch horn 53/blade grip 49, step-over link 69, step-over arm 61, and torque coupling 37/yoke 33, and this four-bar linkage gimbals relative to mast 35 and relative to pitch link 55 during flapping. This means that the angles between members of the four-bar linkage do not change due to flapping, and the only angle change caused by flapping is between pitch link 55 and link end 67 of step-over arm 61. Another advantage to using the step-over linkage is that pitch link 55 can be located further toward an adjacent rotor blade, to achieve desirable coupling terms, than would be possible without interference when using one link extending between the flight control system and pitch horn 53.

FIGS. 3 through 6 show rotor hub assembly 31 with the step-over linkage moved between a first position (FIGS. 3 and 4), which corresponds to reduced blade pitch, and a second position (FIGS. 5 and 6), which corresponds to increased blade pitch. In the preferred embodiment, the step-over linkage moves in a direction opposite that of the leading edge of the associated blade due to pitch horn 53 being located in a trailing position on blade grip 49.

Figure 3:
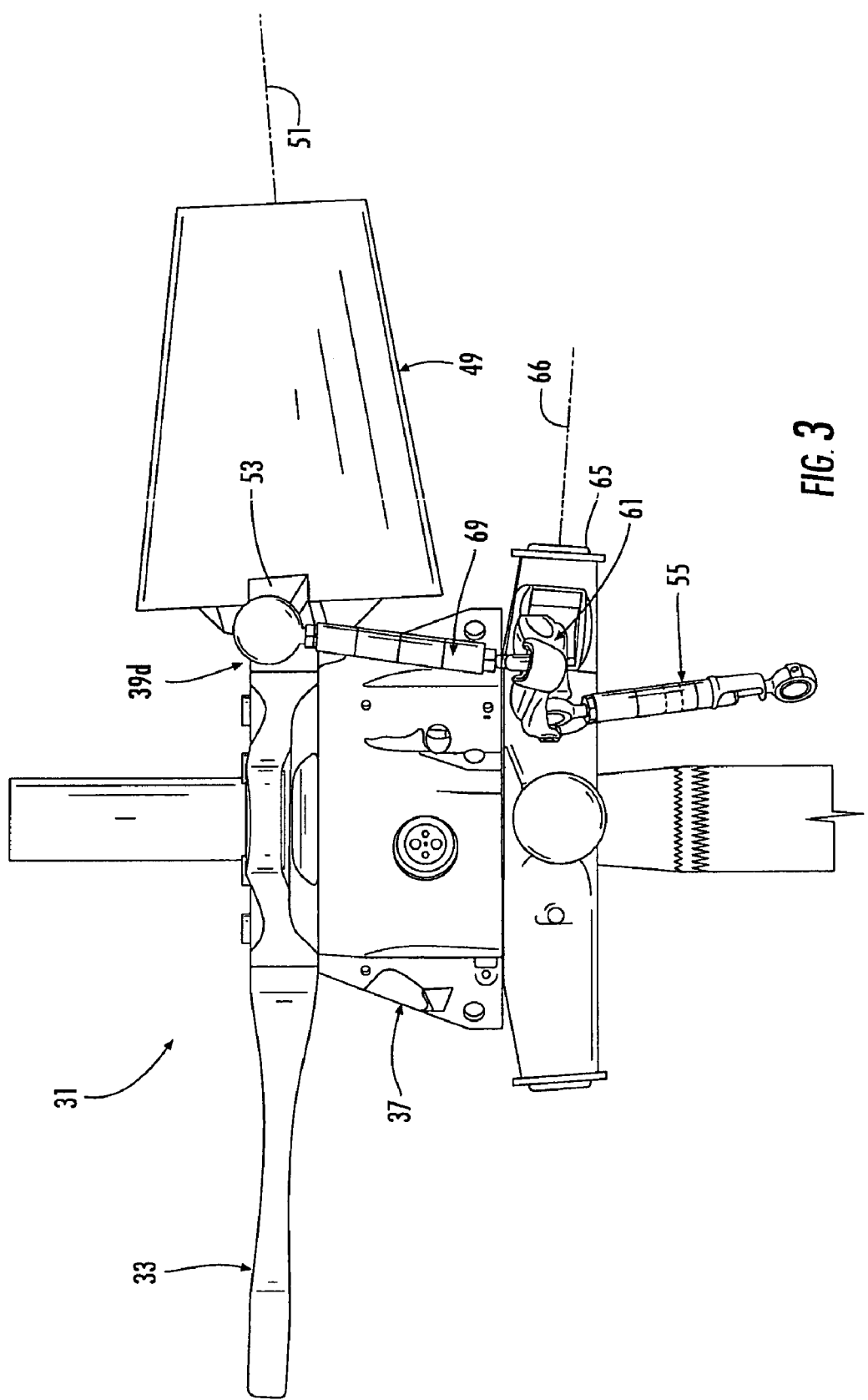
FIG. 3 is a front view of the rotor hub of FIG. 2, the blade-pitch control system of the assembly being shown in a reduced blade-pitch position.
Figure 4:
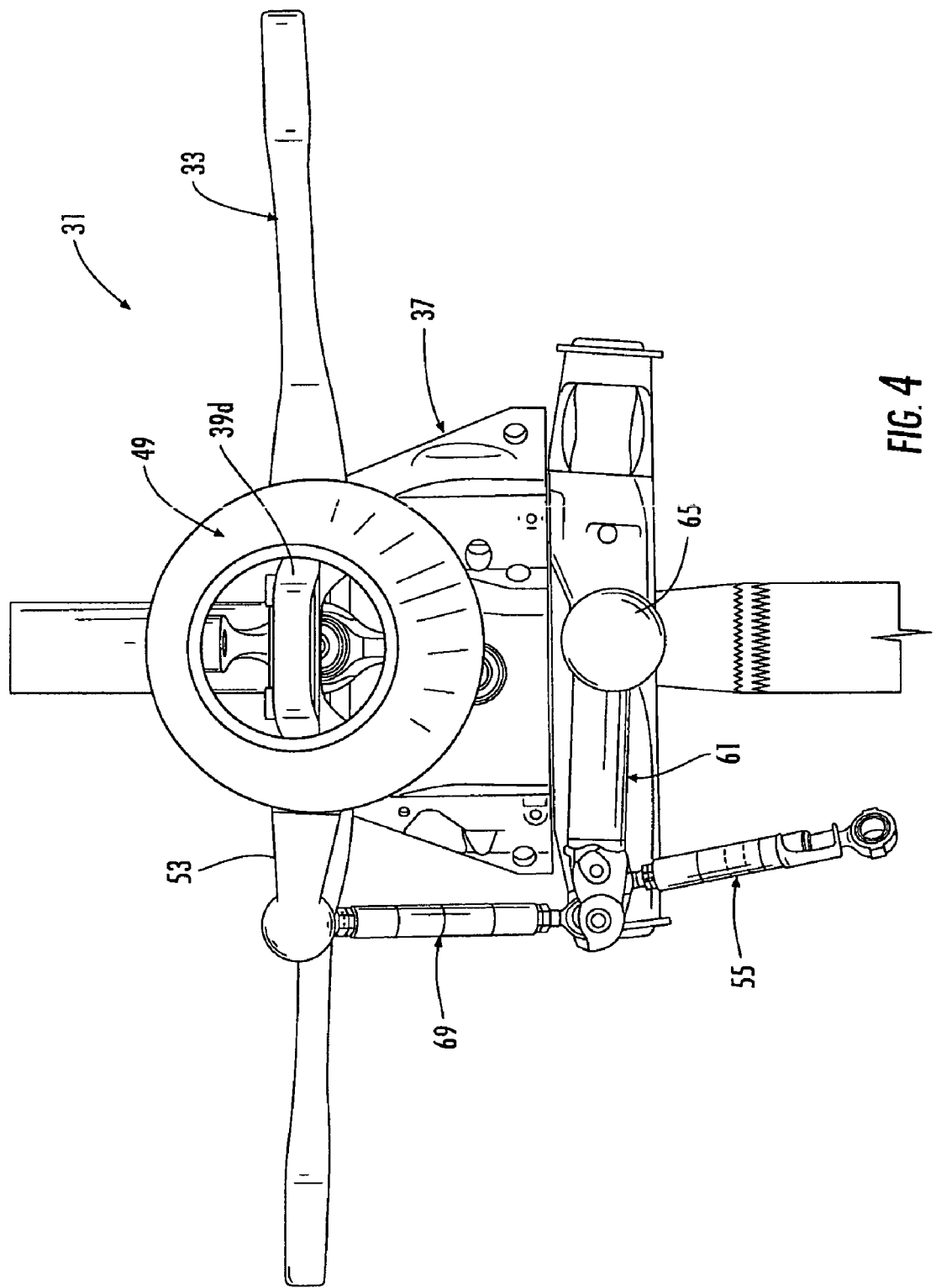
FIG. 4 is a side view of the rotor hub of FIG. 2, the blade-pitch control system of the assembly being shown in a reduced blade-pitch position.

FIGS. 3 and 4 show hub assembly 31 with pitch link 55 moved to an uppermost position, causing step-over arm 61 to rotate about axis 66 and step-over link 69 to also be moved into an uppermost position. Pitch horn 53 is thus moved into an uppermost position, causing blade grip 49 to rotate about pitch axis 51, such that the attached blade is moved to a minimum blade-pitch position.

Figure 5:
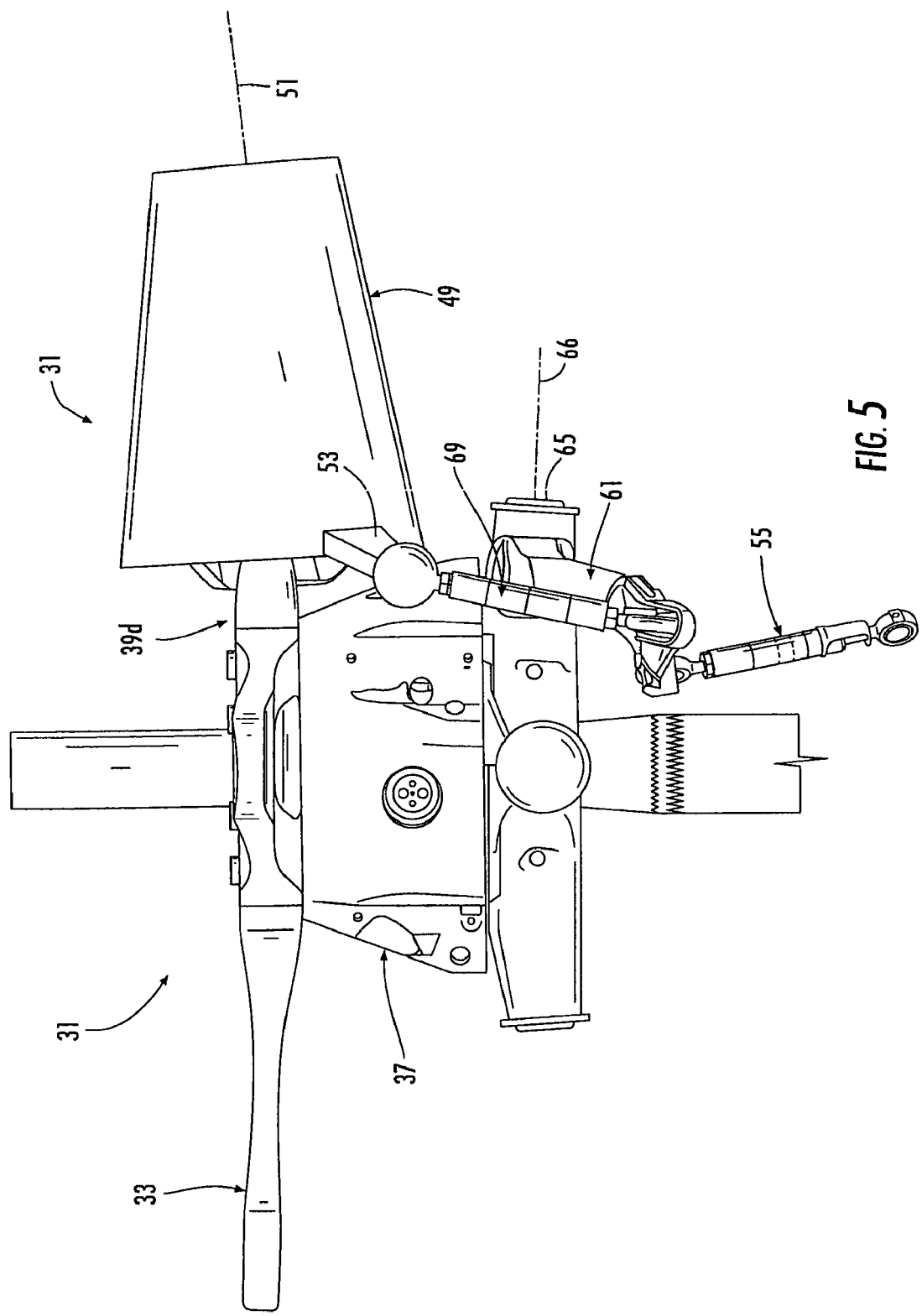
FIG. 5 is a front view of the rotor hub of FIG. 2, the blade-pitch control system of the assembly being shown in an increased blade-pitch position.
Figure 6:
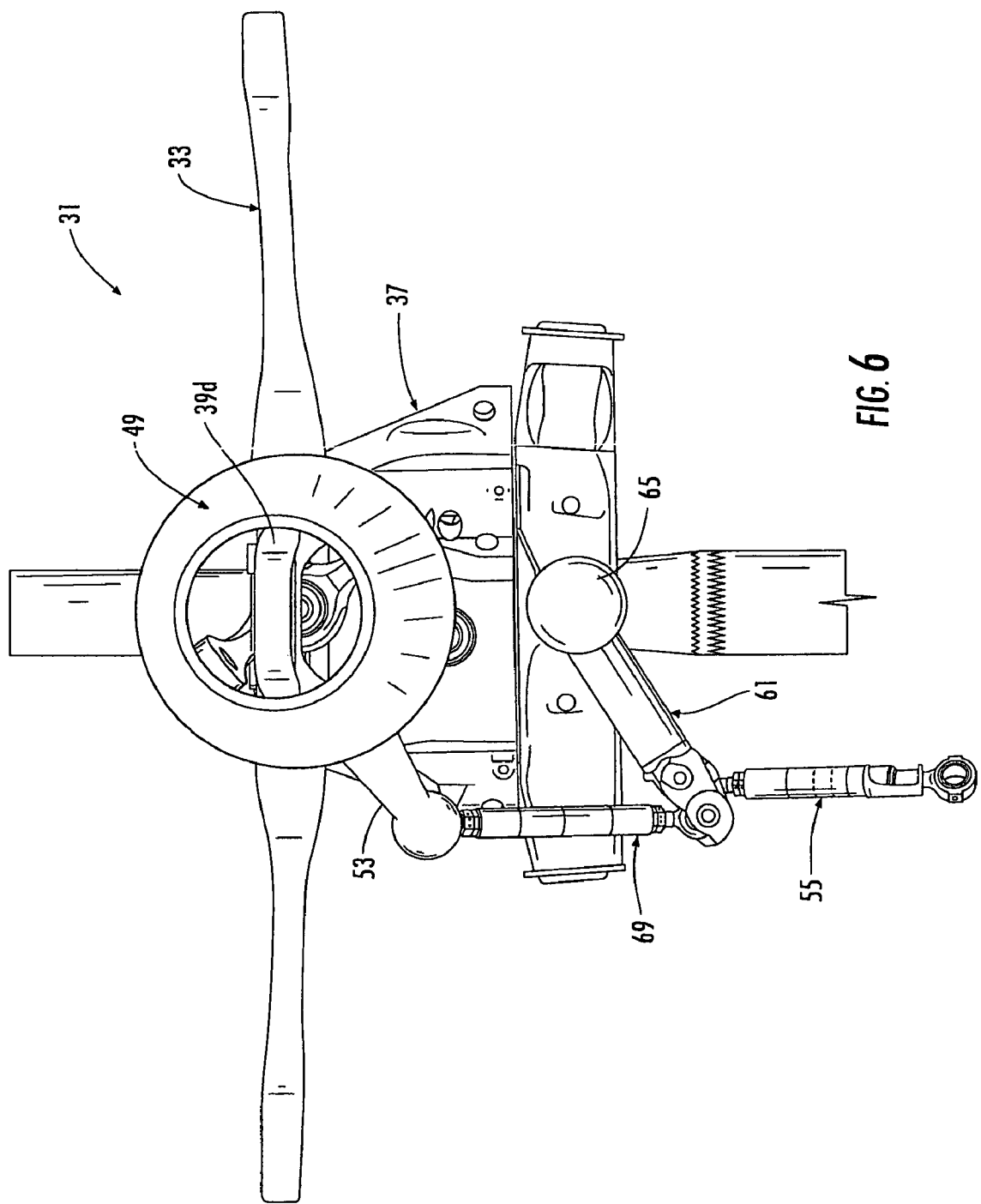
FIG. 6 is a side view of the rotor hub of FIG. 2, the blade-pitch control system of the assembly being shown in an increased blade-pitch position.

FIGS. 5 and 6 show hub assembly 31 with pitch link 55 moved to a lowermost position, causing step-over arm 61 to rotate about axis 66 and step-over link 69 to also be moved into a lowermost position. Pitch horn 53 is thus moved into a lowermost position, causing blade grip 49 to rotate about pitch axis 51, such that the attached blade is moved to a maximum blade-pitch position.

Figure 7:
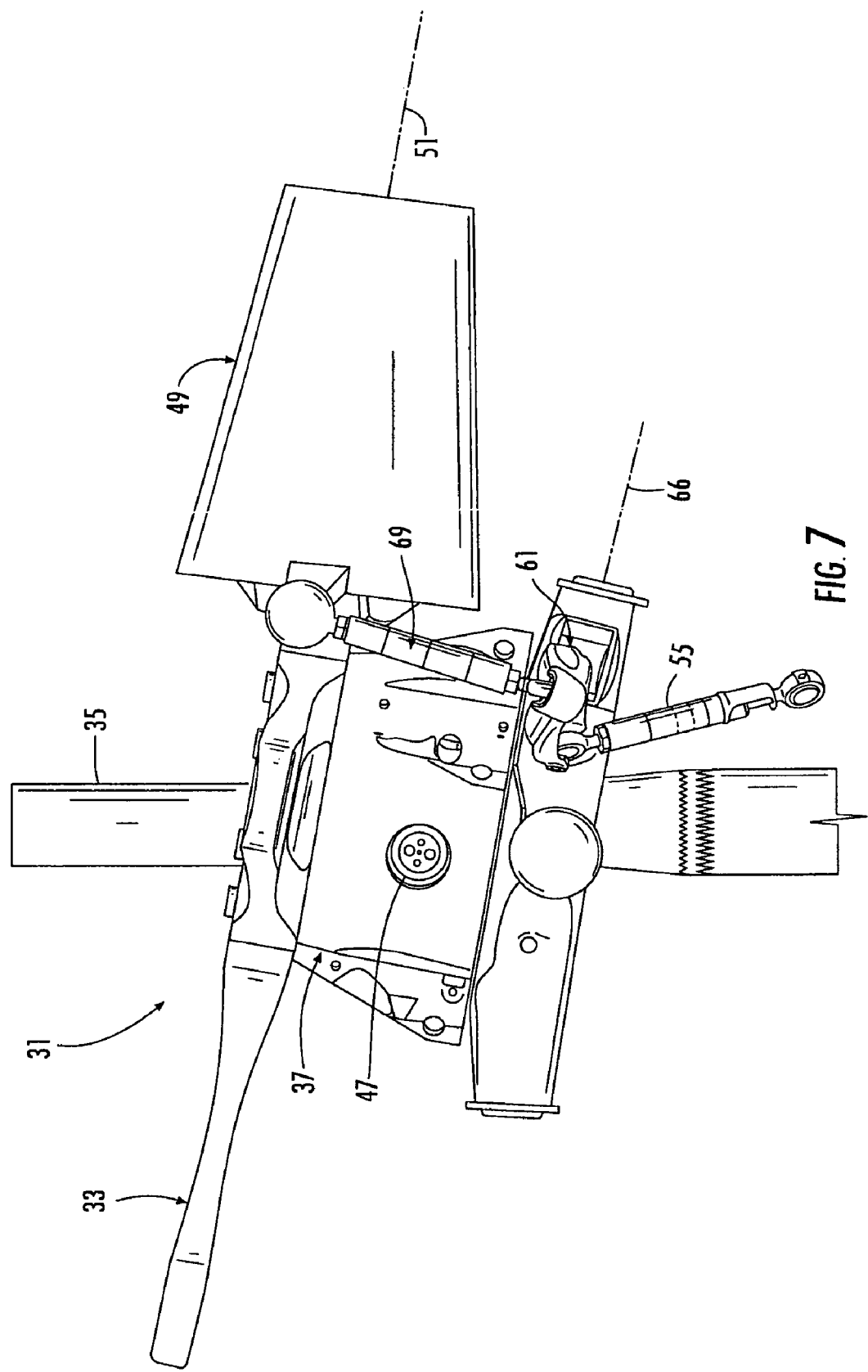
FIG. 7 is a front view of the rotor hub of FIG. 2, the blade-pitch control system of the assembly being shown in a reduced blade-pitch position, the hub assembly being shown in a gimbaled orientation.

FIG. 7 shows hub assembly 31 with step-over linkage moved into the uppermost position and with hub assembly 31 gimbaled relative to mast 35. Assembly 31 is shown rotated about an axis defined by bearing 47, as would occur during flapping, in which advancing blades rise and retreating blades fall. Flapping is allowed to gimbal hub assembly 31, such that yoke 33 and attached blades (not shown) are at an angle relative to mast 35. As described above, the figure shows that the relative angles of the step-over linkage do not change during flapping, except for the angle between pitch link 55 and step-over arm 61. This is where, the unflapped system (pitch link 55 and the associated flight control system) meets the flapped system (hub assembly 31) and where the delta-3 parameter is determined. In this manner, the delta-0 parameter is decoupled from the delta-3 parameter.

The step-over linkage is particularly useful for tiltrotor aircraft. A high delta-3 is desirable in helicopter mode, in which blades are positioned at a small angle relative to the rotor plane, and a low delta-3 is desirable in airplane mode (low collective), in which blades are positioned at a large angle relative to the rotor plane (high collective). Prior-art blade-pitch linkage configurations required an undesirable compromise to be made for one or more parameters. Because the delta-0 and delta-3 parameters are decoupled in the step-over linkage, coning does not affect delta-3, and delta-3 can be optimized throughout the range of collective. This is accomplished by angling the step-over axis 66 relative to the rotor plane, as can be seen in FIGS. 3, 5 and 7. Step-over axis 66 is shown as being angled slightly downward.

Figure 8:
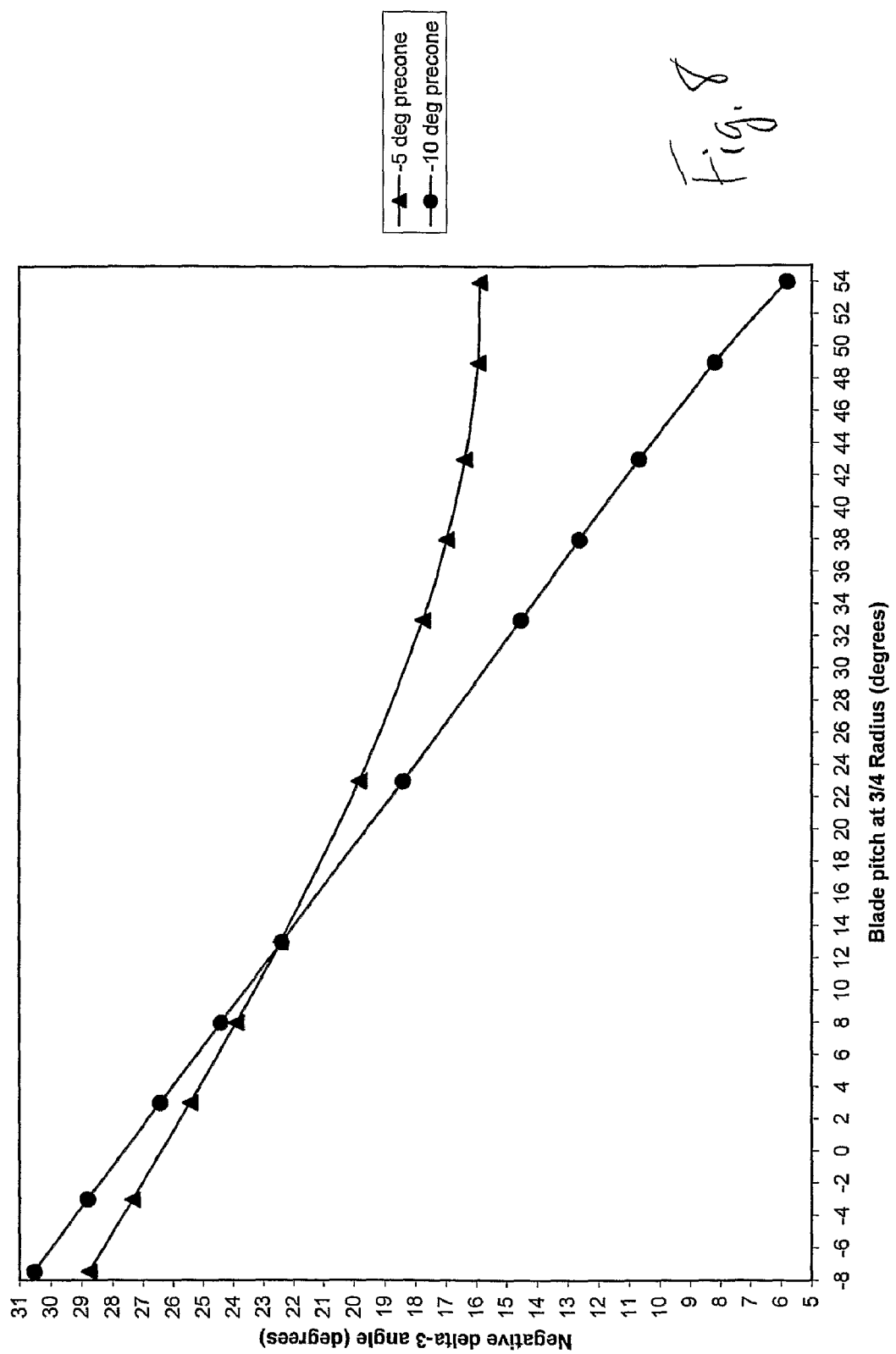
FIG. 8 is a graph showing the relationship between blade pitch and the delta-3 angle for two values of pre-cone for the rotor hub of FIG. 2.

FIG. 8 is a graph showing the plots of negative delta-3 angle versus a given blade pitch angle for two values of precone, which is the angle of step-over axis 66. As described above, a high negative delta-3 is desirable at low collective, which corresponds to helicopter mode and is located toward the left on the x-axis, and a low value of negative delta-3 is desirable at high collective, which corresponds to airplane mode and is located toward the right side on the x-axis. As shown in the graph, for a range of blade pitch from −8 degrees to +54 degrees, a precone value of −5 degrees provides for a range of approximately −31 degrees to approximately −16 degrees of delta-3 angle. However, a lower value of negative delta-3 is typically desirable in airplane mode. The values plotted for −10 degrees of precone show that negative delta-3 is slightly higher in helicopter mode and that delta-3 continues to improve as blade pitch increases, providing favorable coupling terms throughout the range of blade pitch.

It should be noted that the relative locations, as shown, of components in the step-over linkage are to be considered examples. The step-over linkage may be altered from the configuration shown to provide for various advantageous qualities or parameters. For example, through pitch link 55 and step-over link 69 are shown as being connected to step-over arm 61 at approximately the same location, links 55, 69 may be connected at different distances from step-over axis 66. This would allow for a reduction or increase in the amount of travel of one link 55, 69 relative to the other link 55, 69.

The step-over linkage configuration provides for several advantages, including: (1) providing a simple control system for controlling pitch of blades on a gimbaled rotor; (2) providing decoupled pitch-flap and pitch-cone kinematics; and (3) providing the capability for desirable values for both pitch-flap and pitch-cone coupling.

Though reference is made to an illustrative embodiment, this description is not intended to be construed in a limiting sense. Various modifications and combinations of the illustrative embodiments, as well as other embodiments, will be apparent to persons skilled in the art upon reference to the description.

The invention claimed is:

1. A blade-pitch control system for an aircraft, the control system controlling motion of each of a plurality of rotor blades about an associated pitch axis, the control system comprising:
   a rotor hub adapted for rotation with a mast and for gimballing relative to the mast;
   a plurality of step-over arms, each step-over arm being connected to the hub and capable of pivoting relative to the hub about a pivot axis that is in a fixed orientation relative to the hub and moves with the hub during gimballing of the hub;
   a plurality of pitch links, each pitch link being adapted for connecting one of the step-over arms to a flight control system for pivoting the connected step-over arm relative to the hub in response to inputs from the flight control system; and
   a plurality of step-over links, each step-over link being adapted for connecting one of the step-over arms to one of the blades for rotating the associated blade about the corresponding pitch axis in response to pivoting of the associated step-over arm;
   wherein each step-over arm is an elongated arm, one end of the step-over arm being pivotally connected to the hub and an opposite end being free to rotate about the pivot axis, the associated pitch link and step-over link being connected to the step-over arm at a location toward the free end of the step-over arm.

2. The control system according to claim 1, wherein each pivot axis is oriented at a selected angle relative to the hub.

3. The control system according to claim 1, wherein the flight control system comprises a swashplate, and the pitch links are adapted to connect the step-over arms to a rotatable portion of the swashplate.

4. A rotor hub assembly, comprising:
   a coupling adapted for rotation with a mast, at least a portion of the coupling being configured for gimballing relative to the mast;
   a yoke connected to the coupling and adapted to carry a plurality of blades, each blade being pivotable about a pitch axis, the yoke being configured to move with the coupling during gimballing of the coupling;
   a plurality of step-over arms, each step-over arm being connected to the coupling and capable of pivoting relative to the coupling about a pivot axis that is in a fixed orientation relative to the coupling and moves with the coupling during gimballing of the coupling;
   a plurality of pitch links, each pitch link being adapted for connecting one of the step-over arms to a flight control system for pivoting the connected step-over arm relative to the coupling in response to inputs from the flight control system; and
   a plurality of step-over links, each step-over link being adapted for connecting one of the step-over arms to one of the blades for rotating the associated blade about the corresponding pitch axis in response to pivoting of the associated step-over arm;
   wherein each step-over arm is an elongated arm, one end of the step-over arm being pivotally connected to the coupling and an opposite end being free to rotate about the pivot axis, the associated pitch link and step-over link being connected to the step-over arm at a location toward the free end of the step-over arm.

5. The control system according to claim 4, wherein each pivot axis is oriented at a selected angle relative to the coupling.

6. The control system according to claim 4 wherein the flight control system comprises a swashplate, and the pitch links are adapted to connect the step-over arms to a rotatable portion of the swashplate.

7. A rotary-wing aircraft, comprising:
   a mast;
   a coupling configured for rotation with the mast, at least a portion of the coupling being configured for gimballing relative to the mast;
   a yoke connected to the coupling; the yoke being configured to gimbal with the coupling;
   a plurality of blades carried by the yoke, each blade being pivotable about a pitch axis:
   a plurality of step-over arms, each step-over arm being connected to the coupling and capable of pivoting relative to the coupling about a pivot axis that is in a fixed orientation relative to the coupling and gimbals with the coupling;
   a plurality of pitch links, each pitch link being adapted for connecting one of the step-over arms to a flight control system for pivoting the connected step-over arm relative to the coupling in response to inputs from the flight control system; and
   a plurality of step-over links, each step-over link being adapted for connecting one of the step-over arms to one of the blades for rotating the associated blade about the corresponding pitch axis in response to pivoting of the associated step-over arm;
   wherein each step-over arm is an elongated arm, one end of the step-over arm being pivotally connected to the coupling and an opposite end being free to rotate about the pivot axis, the associated pitch link and step-over link being connected to the step-over arm at a location toward the free end of the step-over arm.

8. The control system according to claim 7, wherein each pivot axis is oriented at a selected angle relative to the coupling.

9. The control system according to claim 7, wherein the flight control system comprises a swashplate, and the pitch links are adapted to connect the step-over arms to a rotatable portion of the swashplate.

* * * * *